UNITED STATES PATENT OFFICE.

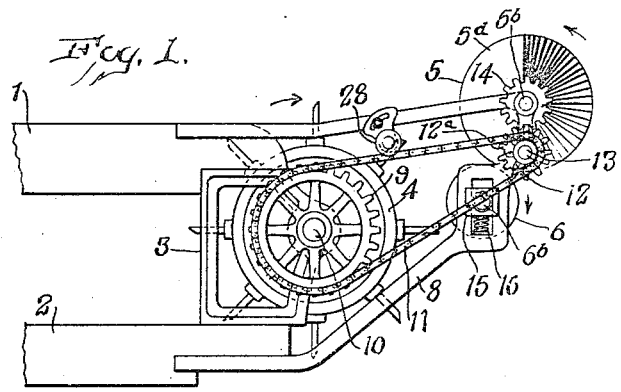
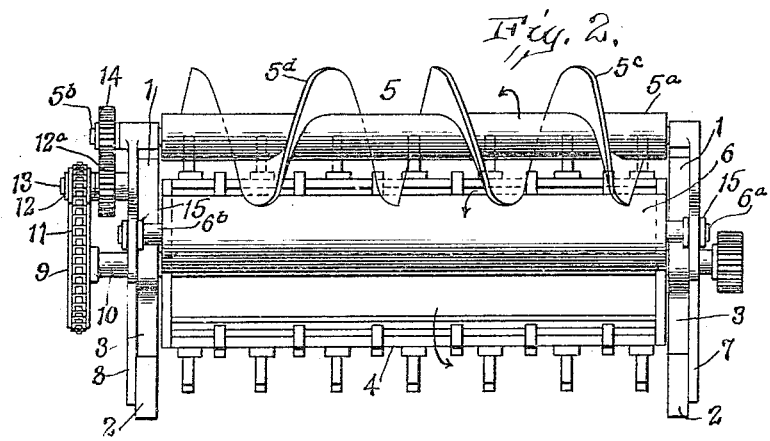
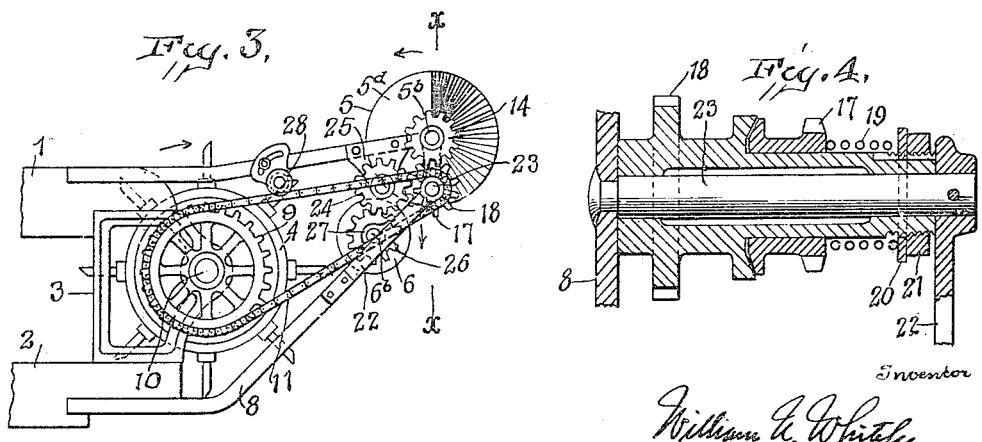
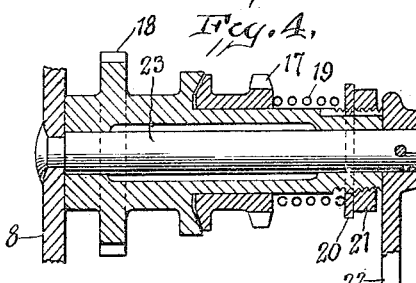

WILLIAM N. WHITELY, OF SPRINGFIELD, OHIO.

WIDE-DELIVERY SPREADER.

1,244,933.  Specification of Letters Patent.  Patented Oct. 30, 1917.

Application filed March 12, 1917. Serial No. 154,341.

*To all whom it may concern:*

Be it known that I, WILLIAM N. WHITELY, a citizen of the United States, residing at Springfield, in the county of Clark and State of Ohio, have invented certain new and useful Improvements in Wide-Delivery Spreaders, of which the following is a specification.

My invention relates to improvements in manure spreaders of the "wide-spread" type, I prefer however, to give the invention the title of wide delivery spreader.

My invention has for its object a more effective pulverization and wide delivery in fine particles of all sorts of manure or fertilizer.

Another object is to obtain a more uniform and even distribution of the finely pulverized manure or fertilizer under all varying and difficult conditions of operation.

I attain these objects by means of the mechanism illustrated by the accompanying drawing, in which—

Figure 1 is a side elevation of the discharge end of a manure spreader showing one form of the mechanism of my invention.

Fig. 2 is a rear view of the mechanism shown in Fig. 1.

Fig. 3 represents a modified form of the mechanism shown in Fig. 1.

Fig. 4 is a transverse vertical section on lines $x$—$x$ of Fig. 3 of the friction drive mechanism forming a part of the modification shown in Fig. 3.

The same reference numerals designate like parts throughout the drawing.

In the drawing the top rail 1 and side sill 2 are parts of the spreader bed and by means of brackets 3 they support the revolving unloading beater 4. The beater 4 and non-illustrated elements of the spreader including the beater drive mechanism, drive wheels, movable bottom or manure conveying mechanism and other operative parts of the machine not represented and which are not directly connected with the invention need not be particularly described, it being understood that any spreader construction suitable to use in connection with the mechanism of my invention may be employed.

The wide delivery spreader mechanism consists of two essential elements, the wide delivery beater 5 and the feed roller or drum 6. The two elements 5 and 6 may be of any desired size or shape and may take any form that will develop their functions in most effective fashion.

They may be arranged or combined in connection with coacting essential elements of the spreader in any manner such as will most effectively attain the described objects of the invention. The wide delivery beater 5 consists of a core $5^a$ rigidly mounted on the axle $5^b$ and has spiral right flange $5^c$ and spiral left flange $5^d$ which flanges are made of light pressed steel and which are rigidly attached to the core $5^a$ (means of attachment not shown).

The feed roller or drum 6 is revolubly supported by means of stub axles or gudgeons $6^a$ and $6^b$ to which it is rigidly secured. The drum 6 is so arranged with relation to beater 5 as to permit the groundward discharge of the manure, thus overcoming irregularity in spreading or possibility of the discharged manure being blown out of proper path. The core $5^a$ and drum 6 are preferably made of light sheet steel lapped and riveted. The pitch of the spiral flanges $5^c$ and $5^d$ which part to right and left at the longitudinal center line of the core $5^a$ is for best results set at such angle as will make one and one half turns of the flange in its length. The beater 5 and the drum 6 are revolubly mounted in frames 7 and 8 which are bolted or otherwise rigidly attached to the top rail 1 and sill 2. The driving mechanism for the parts of my invention as shown in Figs. 1 and 2 consists of a sprocket 9 securely mounted on the shaft 10 of the beater 4, a drive chain 11 transmits motion from said sprocket 9 to a small sprocket 12 mounted on a stud 13 which is riveted or otherwise firmly attached to frame 8 and motion the reverse of the rotation of the beater 4 is imparted to the beater 5 by means of spur gear $12^a$ which is cast integral with small sprocket 12 and sequentially motion is transmitted by means of spur gear 14 which is secured upon the axle $5^b$.

The drum 6 is flexibly supported for the purpose of clearance of obstructions by means of bearings 15 which are slidably supported in slots in the frames 7 and 8 by means of coiled springs 16 which springs are suitably retained in said slots.

In the modified form of my invention as shown in Figs. 3 and 4 the drum also is mechanically driven by means of a friction drive device consisting of a small sprocket 17 revolubly mounted on the hub of spur gear 18 and is held in frictional contact therewith by means of a coiled spring 19 which slips over the extended hub of gear 18, the spring 19 being pressed against the sprocket 17 by means of a splined washer 20 and compress nut 21, as shown in detail in Fig. 4. The stud 23 on which the spur gear 18 is revolubly mounted is rigidly supported by the frame 18 and by brace bar 22 at its outer end, the brace bar 22 being bolted at its lower end to the frame 8. The intermediate spur gear 24 which is driven by spur gear 18 is rotatably mounted on a stud bracket 25 which is secured to frame 8, and said spur gear 24 in turn drives the companion spur gear 26 which is secured on the end of stub axle 6$^b$. In this modification of the mechanism of my invention axle 6$^a$ and 6$^b$ of drum 6 are rotatably supported in stationary boxes 27 (but one being shown, one being the duplicate of the other) which are bolted to the frames 7 and 8. In the modification shown in Fig. 3 power is transmitted to beater 5 by means of its spur gear 14 which meshes with friction driven spur gear 18. An idler 28 which may be of any conventional form is adjustably mounted in any well known fashion on frame 8 for the purpose of taking up slack in chain 11.

In operation the manure or fertilizer is discharged by the unloading beater 4 against the spreaderward side of the oppositely revolving wide delivery beater 5 which is located for such purpose in an upward and rearward position with relation to said beater 4. It will be readily understood that by means of the described mechanism the manure is carried down pulverized and fed over the drum 6 and forcibly delivered groundward in a wide and evenly distributed strip or path. The drum 6, due to the whirling of the beater 5, rotates in opposite direction to said beater 5 and the manure passing between beater and drum is subjected to a final thorough shredding. No manure can pass down between the beater 4 and drum 6 because the function of the drum 6 in carrying the material dischargeward from the periphery of the beater 4 overcomes any such tendency. The drum 6 prevents any clogging of manure on the teeth of beater 4 and said drum 6 which preferably is located in close proximity to beater 5 is cleared by the edges of beater 5. The manure when once it passes over the unloading beater 4 is not again compressed against its dischargeward side but is discharged with the minimum expenditure of power and a maximum degree of pulverization by reason of the anti-frictional combination and arrangement of the coacting elements. The unloading beater 4, as is well known, requires the major portion of the horse power that is necessary to operate the machine, and one object of my invention is to develop the utmost efficiency of the unloading beater 4 in coöperation with the mechanism of my invention while at the same time not to add to its draft demands. It will be observed that the drum 6 spaces widely apart the unloading beater 4 and wide delivery beater 5 and that it also serves as the floor of the pulverizing chamber formed between the two beaters, the ample opening for the manure flow thus provided prevents choking and promotes pulverization. In the modified form of the invention shown in Figs. 3 and 4, the drum 6 is power driven, thus the manure is passed under very close regulation between the beater 5 and drum 6. By providing the spur gear 18 with frictional drive by means of the spring pressed sprocket 17 in the modified form in which both beater 5 and drum 6 are mechanically driven any danger of breakage is overcome inasmuch as both beater 5 and drum 6 if wedged or blocked by an obstruction may remain stationary while the spreader still is in motion without danger of stripping gears.

What I claim as my invention, and desire to secure by Letters Patent, is—

1. In a manure spreader, in combination with a spreader bed and an unloading beater at one end thereof, of a wide delivery beater adapted to receive the manure from said unloading beater and a drum adjacent to and underlying said wide delivery beater.

2. In a manure spreader, in combination with a spreader bed and an unloading beater at one end thereof, of a wide delivery beater adapted to receive the manure from said unloading beater, and a flexibly supported revolving drum underlying and adjacent to said wide delivery beater.

3. In a manure spreader, in combination with a spreader bed and an unloading beater at one end thereof, of a wide delivery beater adapted to receive the manure from said unloading beater, and a power driven revolving drum underlying and adjacent to said wide delivery beater.

4. In a manure spreader, in combination with a spreader bed, and an unloading beater at one end thereof, a wide delivery rotating beater adapted to receive the manure from said unloading beater, a rotating drum adapted to coöperate therewith and located intermediately of said unloading beater and said wide delivery beater whereby under impulse by said wide delivery beater the flow of the manure groundward is unimpeded.

5. In a manure spreader, in combination with a spreader bed and an unloading beater at one end thereof, of an oppositely rotating wide delivery beater adapted to receive the manure from said unloading beater, right and left diverging spiral flanges thereof, a rotating drum underlying and adjacent to said wide delivery beater by means of which the manure is pulverized and forcibly delivered groundward in a wide even strip.

6. In a manure spreader, in combination with a spreader bed and an unloading beater at one end thereof, of an oppositely rotating wide delivery beater adapted to receive the manure from said unloading beater, means connected therewith whereby the manure is delivered groundward in a path of greater width than the wheel tread of said manure spreader and a rotating drum or feed roller underlying said wide delivery beater and adjacent thereto over the periphery of which the manure is fed in the act of delivery.

WILLIAM N. WHITELY.

Copies of this patent may be obtained for five cents each, by addressing the "Commissioner of Patents, Washington, D. C."